Figure 1:
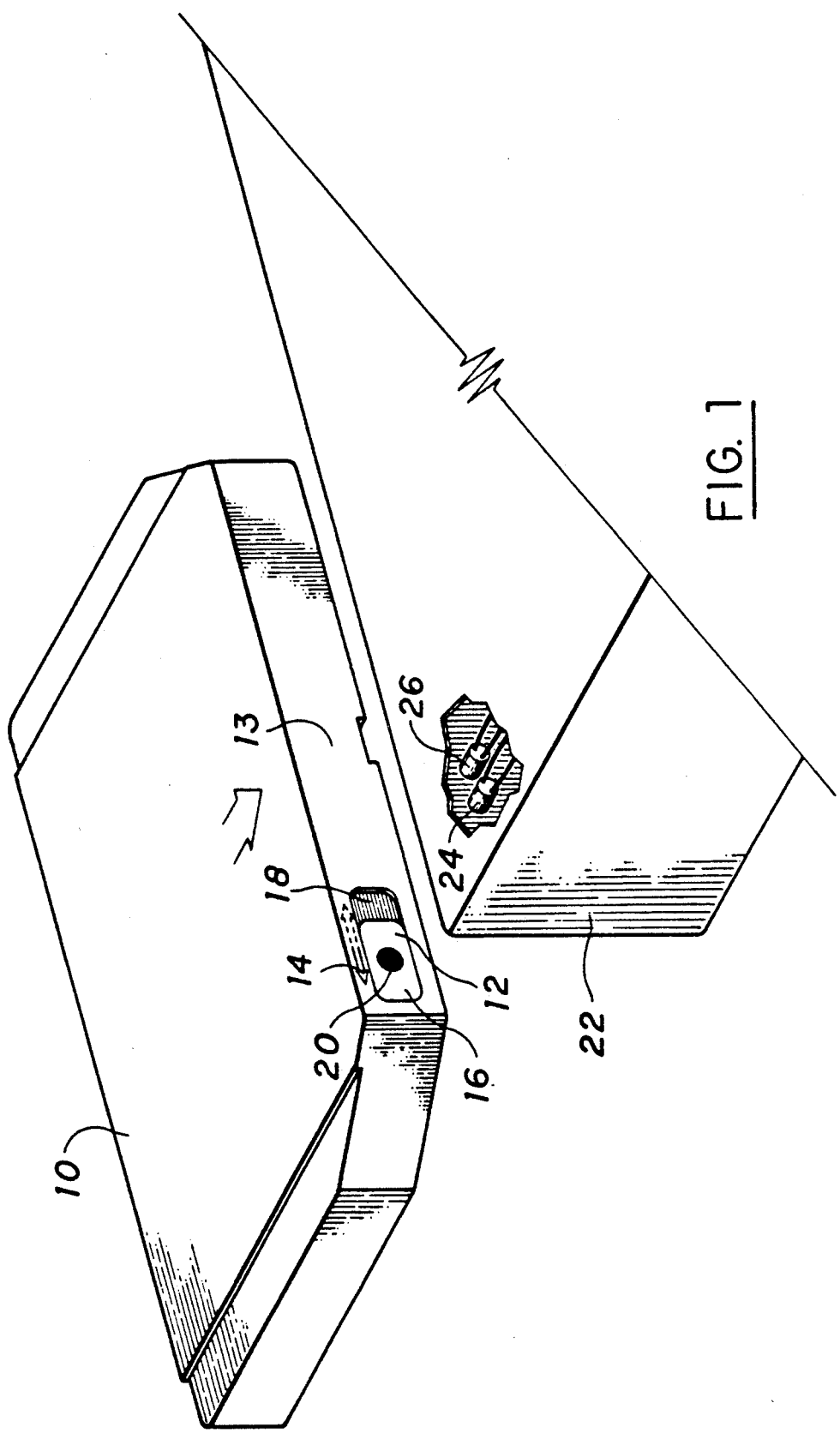

United States Patent [19]

Karsh

[11] Patent Number: 5,016,123
[45] Date of Patent: May 14, 1991

[54] APPARATUS FOR MAGNETICALLY DETERMINING THE STATUS OF A CARTRIDGE IN A MAGNETIC RECORDER

[75] Inventor: Herbert Karsh, Laguna Beach, Calif.

[73] Assignee: Eastman Kodak Company, Rochester, N.Y.

[21] Appl. No.: 417,403

[22] Filed: Oct. 5, 1989

[51] Int. Cl.$^5$ .................. G11B 15/04; G11B 19/02
[52] U.S. Cl. ........................... 360/69; 360/60; 360/132
[58] Field of Search ............... 360/60, 69, 132

[56] References Cited

U.S. PATENT DOCUMENTS 4,511,936  4/1985  Sims, Jr. ................ 360/60 X
4,549,240  10/1985  Hodges .................. 360/133

FOREIGN PATENT DOCUMENTS 54-111321  8/1979  Japan ................ 360/60
60-127566  8/1985  Japan ................ 360/60

*Primary Examiner*—John H. Wolff
*Attorney, Agent, or Firm*—Dennis P. Monteith

[57] ABSTRACT

In the practice of the invention, a small magnet is attached to a slidable tab located on the leading edge of the cartridge. Before insertion of the cartridge into the recorder, the slidable tab is moved by the user to one of two positions. One position is the write protect position for inhibiting recording on the tape in the cartridge, and the other position permits recording on the tape. The associated recorder has two side by side Hall effect sensors. When the cartridge is positioned in the recorder, the magnet, depending upon the selected position of the cartridge tab, is directly opposite to, and activates, only one or the other Hall effect sensors. If no cartridge is in the recorder, neither Hall effect sensor is activated, indicating that no cartridge is in place. If the cartridge is in the recorder, and if the first sensor is activated, then the write protect circuit of the recorder is energized. If the second sensor is activated, then writing on the tape is permitted. The invention thereby provides write protection as well as a positive indication of the presence of the cartridge in the recorder.

Additionally, fixed magnets may also be located on the cartridge for activating other Hall effect sensors in the recorder. These magnets may be configured to indicate a classification of the cartridge to specify the recorder with which it is compatible, or to specify the type of tape loaded in the cartridge.

7 Claims, 2 Drawing Sheets

APPARATUS FOR MAGNETICALLY DETERMINING THE STATUS OF A CARTRIDGE IN A MAGNETIC RECORDER

BACKGROUND OF THE INVENTION

1. Field of the Invention

This invention relates to a magnetic tape recorder and cartridge, and in particular, to determining certain relevant conditions of the cartridge when positioned in the recorder.

2. Description Relative to the Prior Art

It is known in the art that if a magnetic medium containing recorded information is later overwritten, the earlier stored information will be destroyed. If this occurs inadvertently, the result may be a complete loss of valuable data. For that reason, techniques have been developed to prevent unwanted erasure of the medium and such techniques are known as "write protect" features. In a reel to reel recorder, write protect is generally accomplished by removal of a plastic ring that is concentric with the reel hub. The absence of the ring is mechanically detected when the reel is mounted on the transport, and the write circuits accordingly are deactivated. Similarly in an audio cassette or data cartridge the presence or absence of either a plastic knockout or the position of a slidable tab allows a mechanical finger in the recorder to detect a write protect condition. Write protection exists when the finger motion is unimpeded as it enters the resulting void in the tape cassette or cartridge when the cassette or cartridge is inserted into the recorder. A floppy disk has a notch in the disk envelope which, when uncovered, plays a similar write protect role. Considered from the point of view of indications to the recorder itself, it will be noted that the write protect of the prior art functions to prevent recording when either there is no magnetic medium positioned in the recorder, or when the magnetic medium container has been set by the user to inhibit recording. In the prior art, write protect provides no specific indication that the magnetic medium is, in fact, in place in the recorder.

SUMMARY OF THE INVENTION

The present invention not only provides a write protect capability in a cartridge loaded recorder, but also positively indicates that the cartridge is in its operating position. In the cartridge loaded magnetic recorder disclosed in co-pending application Ser. No. 352,431, tape motion is controlled by a servomechanism which derives its control information from a pre-recorded servo track on the tape in the cartridge. If there is no cartridge in the recorder, then it is not only desirable to inhibit the write function, but it is also necessary to completely inactivate the recorder tape drive system. The present invention provides signals which may be adapted to provide this dual capability.

In the practice of the invention, a small magnet is attached to a slidable tab located on the leading edge of the cartridge. Before insertion of the cartridge into the recorder, the slidable tab is moved by the user to one of two positions. One position is the write protect position for inhibiting recording on the tape in the cartridge, and the other position permits recording on the tape. The associated recorder has two side by side Hall effect sensors. When the cartridge is positioned in the recorder, the magnet, depending upon the selected position of the cartridge tab, is directly opposite to, and activates, only one or the other-Hall effect sensors. The magnet's field strength and the location of the sensors are such that both sensors are never simultaneously activated, and also that the field of the magnet cannot affect the information recorded on the tape. If no cartridge is in the recorder, neither Hall effect sensor is activated, indicating that no cartridge is in place. If the cartridge is in the recorder, and if the first sensor is activated, then the write protect circuit of the recorder is energized. If the second sensor is activated, then writing on the tape is permitted. The invention thereby provides write protection as well as a positive indication of the presence of the cartridge in the recorder.

Additionally, if the cartridge containing a tape having a pre-recorded servo track as described above is inadvertently subjected to erasure of the servo track by exposure to a degaussing field, the magnet on the tab may be so selected that it will also be erased. Then upon insertion of the cartridge into the recorder, neither Hall effect sensor will be activated; that is, it will appear to the recorder that no cartridge is in place, and the tape drive system will not be energized. On the other hand, in a recorder application where a cartridge is to be intentionally erased by degaussing, the magnet may be selected with a high enough coercivity to make it immune from demagnetization by a typical degausser.

Fixed magnets may also be located on the cartridge for activating other Hall effect sensors in the recorder. These magnets may be configured to indicate a classification of the cartridge to specify the recorder with which it is compatible, or to specify the type of tape loaded in the cartridge.

DESCRIPTION OF THE INVENTION

Figure 2:
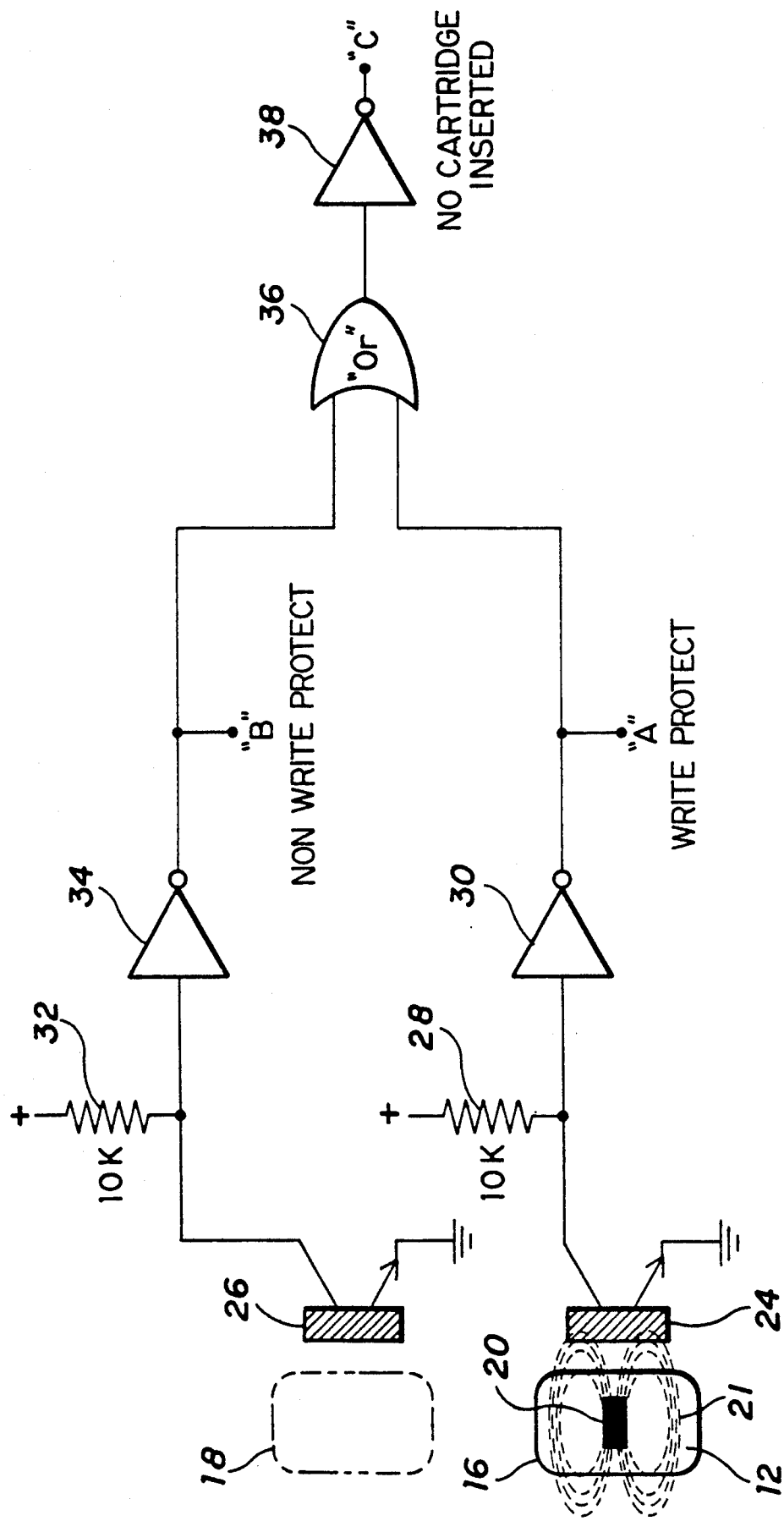

The invention will be described with respect to the figures of which:

FIG. 1 is a perspective drawing of a magnetic tape cartridge and recorder in accordance with the invention, and FIG. 2 is a schematic circuit illustrating the operation of the invention.

In the specification, the term "recorder" is used generically to signify either a magnetic recorder, a magnetic reproducer or a magnetic recorder and/or reproducer. Referring to FIG. 1, a cartridge 10 has a slidable tab 12 mounted on the cartridge front face 13. The slidable tab 12, which is moveable in the direction of the double headed arrow 14, may be placed by the user into either the position 16 or the position 18. Mounted on the tab 12 is a magnet 20. When the cartridge 10 is mated with an associated recorder 22, and the slidable tab 12 is in the position shown, the magnet 20 is adjacent to a Hall effect sensor 24 located in the recorder 22. When the slidable tab 12 is in the position 18, the magnet 20 is adjacent to a second Hall effect sensor 26. The position 16 adjacent to the sensor 24 may be designated the "write protect" position, and the position 18 adjacent to the sensor 26 may be designated as the "non write protect" position.

Referring to FIG. 2, the slidable tab 12 is shown in position 16 where the magnetic field lines 21 of the magnet 20 are intercepted by the Hall effect sensor 24. Under these conditions the Hall effect sensor 24 conducts causing current to flow in the resistor 28 which sets the inPut terminal of the inverting buffer amplifier 30 at ground potential. The output of the amplifier 30 rises, resulting in a positive going signal "A" which is the Write Protect signal. If the slidable tab 12 is in the position 18, the magnet 20 now causes the Hall effect sensor 26 to conduct current, and the output of the inverting buffer amplifier 34 rises resulting in positive going signal "B" which is the "Non Write Protect" signal. The "A" and "B" signals feed an "Or" circuit 36, which in turn feeds the input of an inverting buffer amplifier 38. If either the "A" or "B" signal are high, the output of the "Or" circuit 36 is high, and the output of the amplifier 38 is low, i.e. "C" is low and there is a cartridge in the recorder. If both the "A" and "B" signals are low, the output of the amplifier 38 is high, i.e. "C" is high and there is no cartridge inserted in the recorder.

The invention has been described in detail with particular reference to preferred embodiments thereof, but it will be understood that variations and modifications can be effected within the spirit and scope of the invention. In a similar fashion, provision may be made for mounting one or two fixed magnets at the opposite end of the same edge of the cartridge, and for mounting two additional Hall effect sensors in the recorder positioned opposite to the additional magnets of the inserted cartridge. Such a configuration exhibits four possible states, depending on the number of additional magnets in place and their positions. In this manner the cartridge may be classified for use in one or more of a family of recorders, or the magnetic configuration may be used to identify the type of tape in the cartridge.

What is claimed is:

1. Apparatus for determining a selected functional status of a magnetic tape cartridge positioned in a magnetic recorder and/or reproducer system, said apparatus comprising:
    a. a moveable tab on said cartridge,
    b. a magnet attached to said tab, wherein said tab moves said magnet to a plurality of specific positions relative to said cartridge,
    c. a plurality of magnetic field sensors located in said recorder and/or reproducer system proximate said magnet when said cartridge is positioned within said apparatus, wherein a sensor of said plurality of sensors is responsive to said magnet when said magnet is positioned adjacent to said sensor, whereby the response of said sensor is related to said selected functional status due to the position of said magnet on said movable tab.

2. The apparatus of claim 1 wherein said selected function status is a write protect function.

3. The apparatus of claim 1 wherein said selected function status is a tape motion function.

4. In the combination of a cartridge having a magnetic information-storage medium movably mounted therein and magnetic recorder apparatus adapted to cooperatively receive said cartridge for writing information on or reading information from the storage medium within said cartridge, wherein the improvement comprises:

said cartridge having a magnet mounted for movement between a first position and a second position; and said recorder apparatus including Hall effect sensor means, responsive to a magnetic field produced by said magnet when said cartridge is received by said recorder apparatus, arranged for producing in response to such a magnetic field (1) a write-protect signal when said magnet is in its first position, and (2) a write-enable signal when said magnet is in its second position.

5. The combination of claim 4 wherein said sensor means comprises a plurality of Hall effect sensors.

6. In the combination of a cartridge having a magnetic information-storage medium movably mounted therein, and magnetic recorder apparatus adapted to cooperatively receive said cartridge to effect multiple control operations associated with writing information on or reading information from the storage medium within said cartridge, wherein the improvement comprises:

said cartridge having a magnet;

said recorder apparatus including Hall effect sensor means, responsive to a magnetic field produced by said magnet when said cartridge is received by said recorder apparatus, for producing a first control signal associated with a first control function of said recorder apparatus when a magnetic field produced by said magnet is sensed by said sensor means and for producing a second control signal associated with a second control function of said recorder apparatus when such magnetic field is not sensed by said sensor means.

7. In the combination of a cartridge having a magnetic information-storage medium movably mounted therein, and magnetic recorder apparatus adapted to cooperatively receive said cartridge to effect multiple control operations associated with writing information on or reading information from the storage medium within said container, wherein the improvement comprises:

said cartridge having a magnet mounted for movement between a first position and a second position;

said recorder apparatus including Hall effect sensor means arranged for producing a first 2-state control signal, in response to a magnetic field produced by said magnet when said cartridge is received by said recorder apparatus, that is functionally dependent on whether said magnet is in its first position or its second position; and said recorder apparatus further including control circuitry, coupled to said Hall effect sensor means, arranged for producing a second 2-state control signal that is functionally dependent on whether said cartridge is removed from or is received by said recorder apparatus and for effecting (1) either a write protect condition or a write enable condition as a function of the state of said first control signal, and (2) a medium transport condition as a function of the state of said second control signal.

* * * * *